(No Model.)

J. H. WESTON.
Lightning Rod Coupling.

No. 231,203.                    Patented Aug. 17, 1880.

Attest.
E. R. Hill
Jno. W. Strehli

Inventor.
James H. Weston,
per Wm. Hubbell Fisher,
Atty.

UNITED STATES PATENT OFFICE.

JAMES H. WESTON, OF CINCINNATI, OHIO.

LIGHTNING-ROD COUPLING.

SPECIFICATION forming part of Letters Patent No. 231,203, dated August 17, 1880.

Application filed April 23, 1880. (No model.)

*To all whom it may concern:*

Be it known that I, JAMES H. WESTON, of Cincinnati, Hamilton county, Ohio, have invented certain new and useful Improvements in Lightning-Rod Couplings, of which the following is a specification.

My invention is especially applicable to that class of lightning-rods known as "star" rods; and its object is to provide a coupling that will protect the ends of the rods, leaving no surface exposed to be acted upon by rust.

Figure 1:
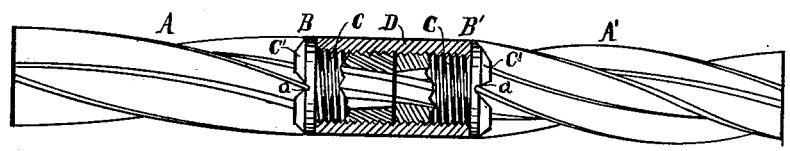
Figure 2:
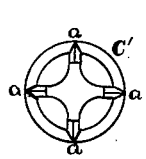

In the drawings forming part of this specification, Figure 1 represents two rods connected by my improved coupling, part of said coupling being in section to show the meeting of the ends of the rods. Fig. 2 represents one of the ferrules into which the ends of the rods are inserted; and Fig. 3 is one end of a rod withdrawn from said ferrule.

Figure 3:
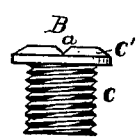

A A' are the rods, the ends of which are reduced in size, as shown in Fig. 3, to be inserted into the ferrules B B'. Each of the shoulders formed by this reduced portion fits into a notch, *a*, in the top of the ferrule, as shown in Fig. 1. These ferrules B B' consist of a screw portion, C, and a flanged portion or head, C', the diameter of the head being equal to the entire diameter of the rod, and the screw portion being somewhat reduced to admit of being screwed into the sleeve D, whose exterior diameter is the same as the diameter of the head C' of the ferrule.

The reduced ends of the rods A A' are inserted into the ferrules B B' and securely brazed or soldered therein, and the shoulders of the rod A are securely brazed or soldered in the notches *a*.

The ferrules are screwed into the sleeve D, the ends of the rods extending far enough to come in contact with each other, making a continuous conductor. The ends of the ferrules B B' preferably also come in contact with each other within the sleeve D. These ferrules and the sleeve may be made of any desired metal, but are preferably made of copper or brass, which metals are not corroded by the action of water.

A lightning-rod coupling constructed as herein described makes a neat and desirable joint, and leaves no portion of the rod exposed to be acted upon by water. The latter corrodes and weakens the joint wherever it comes into contact with the iron of the rod.

My coupling prevents the admission of liquid or moisture to the surface of the iron of the rod, and thereby prevents the latter from corrosion and decay.

Having thus fully described my invention, what I claim as new, and desire to secure by Letters Patent, is—

1. In a lightning-rod coupling, the combination of the rods A A' and the ferrules B B', provided with heads C', and the sleeve D, substantially as and for the purposes specified.

2. The combination of the star-shaped rod A, the ferrule B, the latter being provided with a head, C', said head being provided with the notches or recesses *a*, and the sleeve D, substantially as and for the purposes specified.

3. The combination of the star-shaped rod A, the ferrules B B', respectively provided with heads C C', having notches or recesses *a*, and the sleeve D, substantially as and for the purposes specified.

JAS. H. WESTON.

Attest:
L. H. PUMMILL,
JNO. W. STREHLI.